United States Patent
Cornwall et al.

(10) Patent No.: US 8,594,599 B2
(45) Date of Patent: Nov. 26, 2013

(54) READ-AHEAD TECHNIQUES FOR DATA LOGGING

(76) Inventors: Mark K. Cornwall, Spokane, WA (US); Bret Holmdahl, Greenacres, WA (US)

( * ) Notice: Subject to any disclaimer, the term of this patent is extended or adjusted under 35 U.S.C. 154(b) by 230 days.

(21) Appl. No.: 13/168,669

(22) Filed: Jun. 24, 2011

(65) Prior Publication Data

US 2012/0329499 A1 Dec. 27, 2012

(51) Int. Cl.
*H04B 1/18* (2006.01)

(52) U.S. Cl.
USPC ............... 455/155.1; 455/226.4; 340/870.02

(58) Field of Classification Search
USPC ............... 455/155.1, 226.4, 405; 340/870.01, 340/870.02; 324/435
See application file for complete search history.

(56) References Cited

U.S. PATENT DOCUMENTS

| | | | |
|---|---|---|---|
| 7,362,236 B2 * | 4/2008 | Hoiness | 340/870.02 |
| 8,024,596 B2 * | 9/2011 | Burge et al. | 713/340 |
| 2001/0038342 A1 * | 11/2001 | Foote | 340/870.02 |
| 2005/0162283 A1 | 7/2005 | Salazar Cardozo | |
| 2007/0063867 A1 * | 3/2007 | Fuller et al. | 340/870.02 |
| 2008/0048883 A1 * | 2/2008 | Boaz | 340/870.02 |
| 2008/0272933 A1 * | 11/2008 | Cahill-O'Brien et al. | 340/870.02 |
| 2008/0290986 A1 * | 11/2008 | Laughlin-Parker et al. | 340/3.8 |
| 2009/0146839 A1 * | 6/2009 | Reddy et al. | 340/870.02 |
| 2009/0225811 A1 * | 9/2009 | Albert et al. | 375/132 |
| 2009/0287433 A1 * | 11/2009 | Houston et al. | 702/62 |

(Continued)

FOREIGN PATENT DOCUMENTS

| | | |
|---|---|---|
| CA | 2591105 | 11/2008 |
| CA | 2754438 | 1/2012 |
| WO | WO2008086231 | 7/2008 |

OTHER PUBLICATIONS

Canadian Office Action mailed Sep. 10, 2012 for Canadian patent application No. 2754475, a counterpart foreign application of U.S. Appl. No. 13/168,669, 6 pages.
Canadian Office Action mailed May 2, 2012 for Canadian patent application No. 2754475, a counterpart application of U.S. Appl. No. 13/168,669, 6 pages.
Canadian Office Action mailed Jan. 30, 2013 for Canadian patent application No. 2754438, a counterpart foreign application of U.S. Appl. No. 13/168,704, 8 pages.

(Continued)

*Primary Examiner* — Dominic E Rego
(74) *Attorney, Agent, or Firm* — Lee & Hayes, PLLC

(57) ABSTRACT

Radio messages may be transmitted by endpoints delivering utility consumption data. A portable unit may traverse a route among the endpoints and obtain the consumption data. If the endpoints are sufficiently grouped, communication between the portable unit and a plurality of endpoints may be possible in a same power cycle to a radio of the portable unit while the portable unit is at a single location. In a two-way communication environment, the portable unit may send commands to a plurality of endpoints during a single power cycle, which may result in responses from the plurality of endpoints during the same power cycle. Such communications may be performed with endpoints that are ahead of a current endpoint on the route being traversed, and may constitute read-ahead data. Read-ahead data reduces power cycles to the radio, because when the portable unit reaches an endpoint on the route whose data has previously been read, a power cycle is not required.

14 Claims, 6 Drawing Sheets

(56) References Cited

U.S. PATENT DOCUMENTS

2010/0070103 A1* 3/2010 Fleck et al. .................. 700/296
2010/0176967 A1* 7/2010 Cumeralto et al. ...... 340/870.02
2011/0103299 A1   5/2011 Shuey
2011/0267202 A1* 11/2011 Efthymiou et al. ...... 340/870.03
2012/0017611 A1*  1/2012 Coffel et al. ..................... 62/89
2012/0075092 A1*  3/2012 Petite et al. ................ 340/539.1
2012/0331092 A1* 12/2012 Cornwall .................... 709/217

OTHER PUBLICATIONS

Canadian Office Action mailed Sep. 6, 2012 for Canadian patent application No. 2,754,438, a counterpart foreign application of U.S. Appl. No. 13/168,704, 5 pages.

Non-Final Office Action for U.S. Appl. No. 13/168,704, mailed on Dec. 12, 2012, Mark K. Cornwall, "Conditional Command Data Reading Techniques", 9 pages.

* cited by examiner

READ-AHEAD TECHNIQUES FOR DATA LOGGING

RELATED APPLICATIONS

This patent application claims priority to related to U.S. patent application Ser. No. 13/168,704, titled "Conditional Command Data Reading Techniques", filed on Jun. 24, 2011, commonly assigned herewith, and hereby incorporated by reference.

BACKGROUND

Utility companies ("utilities") have been providing resources, such as electricity, natural gas and water to customers for years. Meters may be used to measure consumption of the resources by the customers. Such meters may be enhanced with additional functionality, such as radio transmission, and may be considered an "endpoint." These endpoints may then be read remotely by a portable meter reading device. Traditionally, an employee of the utility walks or drives along a route using a portable meter reading device to collect the meter data of meters along the route.

However, closely-grouped endpoints provide a jumble of signals to a portable unit attempting to read information from the endpoints. In particular, two-way communication with a plurality of endpoints remains problematic.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
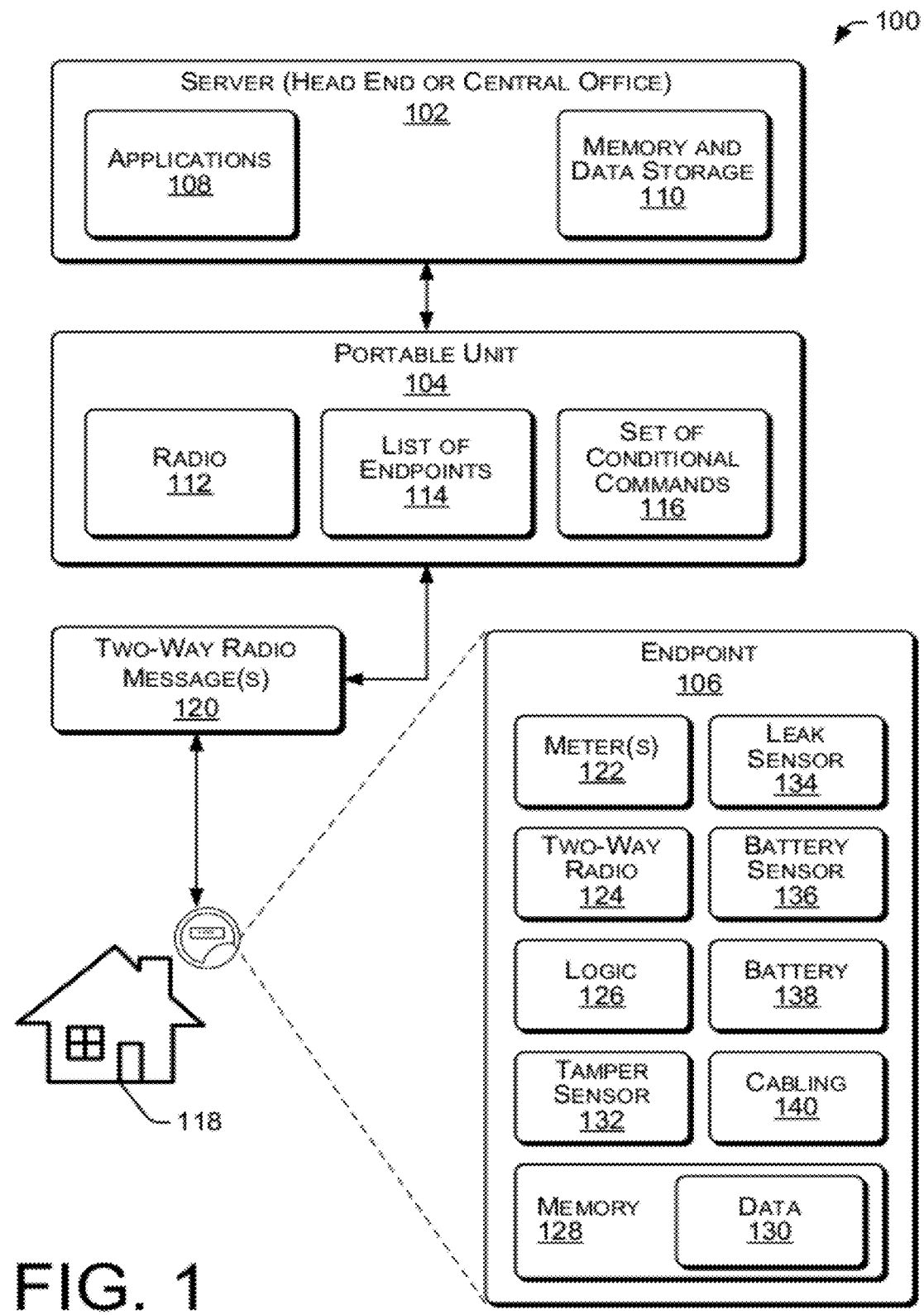
FIG. 1 is a schematic diagram of an example of a non-networked environment in which two-way radio communication is used in read-ahead techniques for data logging and is used in conditional command data reading techniques. An example relationship between a central office server, a portable unit for data collection and an endpoint is shown. The two-way communication between the portable unit and the endpoint(s) facilitates read-ahead techniques for data logging and conditional command data reading techniques.

An example illustrating some of the techniques discussed herein—not to be considered a full or comprehensive discussion—may assist the reader to understand techniques for collecting metering data associated with resource consumption in a utility (e.g., electric, gas or water) setting. The example includes operation of computer server(s), portable unit(s) and endpoint(s). Example techniques describe enhancements for two-way communication between a portable unit and endpoints. In a first example, read-ahead techniques for data logging are discussed. Such read-ahead techniques obtain data not only of a current endpoint of concern, but also a plurality of other endpoints that may be within radio range. Such data is buffered and available for later use, thereby reducing a number of radio cycles. In a second example, conditional command data reading techniques ("reflex reads") are discussed. Such techniques may iteratively recognize conditions in an endpoint, select a command consistent with the recognized conditions, and transmit the selected command.

A server, head-end or central office computing device may exchange data with one or more portable units. The data exchange may include downloading to the portable unit one or more lists of endpoints and one or more sets of conditional commands. Additionally, the server may receive or upload, from portable unit(s), consumption data of a plurality of endpoints. The consumption data may be organized in a predetermined manner, such as a conventional or agreed upon format or data structure. In some cases, and with respect to certain particular endpoints, the consumption data may be supplemented with additional information. Such information may include pro-rata data reflecting a change in the customer at a specific endpoint during mid-month or mid-billing cycle (e.g., move-in/move-out data), battery strength information, meter tampering information, meter failure information, and optionally data of other types.

In cases where the data is supplemented, the additional data may have been obtained by interrogation of the endpoints by commands provided by the server to the portable unit. The commands may be passed from the server to the portable unit as part of the list of endpoints. The list of endpoints may be organized into a "route," i.e. a sequential grouping of endpoints that a meter-reading employee of a utility may traverse, while in possession of the portable unit, in the course of a work day or other period of time. The commands within the list of endpoints may be considered "primary" commands, in that they may be associated with a particular endpoint ID and are transmitted to that endpoint without regard to conditions at that endpoint.

Additionally, the server may provide the portable unit with a set of conditional commands. Each conditional command may be associated with conditions. If the conditions are met by a particular endpoint, the conditional command associated with the satisfied conditions is sent to that endpoint by the portable unit.

The portable unit may be a hand held unit or a mobile unit adapted for vehicle use. A two-way radio allows communication with endpoints along a route associated with a list of endpoints downloaded from the server. In one example, the list of endpoints contained within memory of the portable unit may include a list of endpoint IDs. One or more of the endpoint IDs may be associated with one or more commands. That is, any endpoint ID in the list of endpoints may, in its individual capacity, be associated with one or more commands. Other endpoint IDs within the list of endpoints may be associated with one or more commands, which may be the same or different commands than are associated with other endpoint IDs. These primary commands are submitted to the associated endpoint without regard to circumstances. That is, there are no conditions or circumstances that must be met or satisfied before these commands are sent to the endpoint associated with the endpoint ID. One or more conditional commands may be submitted to any endpoint having circumstances which satisfy the conditions associated with the one or more conditional commands.

In one example, the portable unit moves along a route inspired by the order of the list of endpoints. The portable unit is moved to a location adjacent to a "current" endpoint. Data for endpoints prior to the current endpoint have already been collected and logged into a data structure. For example, data for endpoints prior to the current endpoint have already been copied from the buffer and populated into a data structure or format for upload to a head-end. At the location adjacent to the current endpoint, the operator may provide input (such as by pressing a button) to the portable unit. If data associated with the current endpoint has already been collected and buffered within memory of the portable unit, it may be loaded or populated into a data structure for later upload to the server. In one example, data is passed from the buffer to an API, which transfers the data to an application. The application may then load the data structure. Data in the buffer may have been received in a previous radio cycle, and may be considered to be "read ahead" data, in that it was obtained by the radio "reading ahead" of the current location to obtain data from endpoint(s) further along the route. Buffered read-ahead data is advantageous, since power does not have to be cycled to the radio of the portable unit to log such data. However, if data associated with the current endpoint is not yet stored in memory of the portable device, power is cycled to the radio of the portable unit.

In a radio cycle of the portable unit, the radio listens (receives) messages sent by one or more endpoints. Such messages may include an ID of the endpoint, consumption data and additional information and/or flags. Such messages may be referred to as "standard consumption messages," in that they contain the information typically required to provide a bill or invoice to the customer associated with the endpoint. In particular, the consumption data may describe the usage of the customer, in terms of kilowatt hours, cubic feet of natural gas, cubic feet of water or other units of the same or different resources.

In an example cycle of power to the radio of the portable unit (e.g., 5, 10 or 60 seconds long), one or more (e.g., 1, 10, 100) such standard consumption messages may be heard from that many different endpoints. The cycling of power to the radio may reduce the duty cycle of the radio to below fifty percent of total operating time of the portable unit, and may reduce radio duty cycle to a much smaller percentage. Due to location, the standard consumption message of the current endpoint will be among those read (received) by the portable unit. The data associated with the current endpoint may be logged into an appropriate location in the data structure to be uploaded to the server when the portable device is reconnected to the server. The data associated with other endpoints (not previously processed) may be buffered, so that the data will be available in the buffer, for logging into the data structure, without a further radio cycle.

During the radio cycle, the list of endpoints is examined to determine if the current endpoint, or any other endpoint from which a message was received, is associated with a (primary) command. Within the radio cycle, or a subsequent radio cycle, as many such commands as possible are transmitted. The commands may be based in part on reception of messages from the endpoints, which are received in a random manner (i.e., not in the order of the list of endpoints). Because the commands are transmitted to the endpoints in an order based on receipt of messages from the endpoints, the commands are transmitted in a random manner. Because of physical proximity of the portable unit to the current endpoint, a command will typically be sent to that endpoint during a power and/or radio cycle. In the case of read-ahead endpoints, the responses to the commands are buffered. The response to a command (if any) of the current endpoint is processed and associated data is added to the data structure.

During the radio cycle, one or more endpoints may exhibit conditions consistent with one or more conditional commands. For example, an endpoint may indicate that there is a water leak sensor attached to the endpoint. This condition may satisfy the conditions associated with a command that asks for data from the water leak sensor. Such data may not be part of the standard consumption message because most endpoints may not have such leak sensors. In this example, a conditional command, asking for leak sensor data, may be sent to the appropriate endpoint. Data from any conditional command(s) associated with the current endpoint may be added to the data structure for later upload to the server. Data from conditional commands associated with other endpoints may be buffered for later addition to the data structure, such as when that endpoint becomes the current endpoint.

More than one conditional command may be sent to a single endpoint. This may be the case when the conditions change and/or evolve. For example, a set flag may trigger a command asking for status. The response may indicate possible tampering with the meter of the endpoint. A subsequent conditional command may ask for a dump of all information about meter tampering. Such detailed data may not be a part of the standard consumption message initially sent by the endpoint because such circumstances are rare, and such data would unnecessarily clutter the standard consumption message.

The discussion herein includes several sections. Each section is intended to be non-limiting. More particularly, this entire description is intended to illustrate components which may be utilized in read-ahead techniques for data logging and conditional command data reading techniques, but not components which are necessarily required. The discussion begins with a section entitled "Example Data Logging System," which describes one environment that may implement the techniques described herein. This section depicts and describes data logging, the buffering of read-ahead commands and the use of conditional commands using a high-level architecture. Next, a section entitled "Example Portable Unit" illustrates and describes aspects that can be used in the structure and operation of a portable device to gather resource consumption data and related information. A third section, entitled "Example Read-Ahead Techniques" illustrates and describes techniques that may be used to receive and buffer data from endpoints beyond a current endpoint during a power cycle of the radio of a portable unit. A fourth section, entitled "Example Primary and Conditional Command Techniques" illustrates and describes techniques that may be used to send primary commands and techniques that identify conditions associated with conditional commands and that transmit such commands. A fifth section, entitled "Example Methods" illustrates and describes techniques that may be used to implement read-ahead techniques and conditional command techniques. Finally, the discussion ends with a brief conclusion.

This brief introduction, including section titles and corresponding summaries, is provided for the reader's convenience and is not intended to limit the scope of the claims or any section of this disclosure.

Example Data Logging System

FIG. 1 is a schematic diagram showing an example data logging system 100. The data logging system is adapted for gathering of consumption data from endpoints. In one example, the consumption data includes consumption of resources such as electricity, natural gas and water. The consumption data may also be associated with time, including consumption per hour, day or over the course of a billing cycle, such as a month. In the example of FIG. 1, a server 102 representing computing systems at a utility head-end or central office may configure some aspects of software and data contained on a portable unit 104. During use and operation, the portable unit 104 may be moved through one or more "routes" through areas populated by endpoints. During the movement, the portable unit 104 is operated to gather consumption data and related information from a plurality of endpoints 106.

As shown in FIG. 1, the server 102 may include one or more applications 108. The applications 108 may include programs having a variety of purposes and classifications, such as operating system, communications, data logging, data and memory management, portable unit management and other purposes.

The server 102 may also include a memory and data storage device 110, which may be based on magnetic disk, tape, RAID (redundant array of inexpensive disks), solid state, flash memory or other technology. The memory and data storage device 110 may contain data obtained by the portable unit 104. In particular, the memory and data storage device 110 may be configured to store consumption data obtained from endpoints 106, as well as information received from commands sent to the endpoints. Additionally, the memory and data storage device 110 may be configured to store lists of endpoints and/or sets of conditional commands for download to one or more portable units.

The portable unit 104 may include a radio 112, configured for two-way communication with the endpoints 106. The radio may be designed to function at a plurality of different frequencies in a rotating or simultaneous manner. Additionally, the radio may be configured for operation in a cyclical manner (i.e., turned on for set periods or for a set duty cycle), or for operation during timed periods initiated by input from an operator.

The portable unit 104 may have an interface with the server, allowing it to download data including a list of endpoints, a set of conditional commands and other data as needed. The interface also allows the upload of consumption data, endpoint information and other data. The portable unit 104 may include a list of endpoints 114. This list may be downloaded from the server 102, and may be defined in memory of the portable unit 104. The list of endpoints 114 may include endpoint IDs of a plurality of endpoints 106. Additionally, the list of endpoints 114 may associate one or more endpoint IDs with a command. Such commands may be associated with an endpoint ID by the server 102, such as when additional information is required from the endpoint 106. Additional information may be required, for example, if a customer is moving out mid-month and a mid-month consumption reading is required. The list of endpoints 114 may form the basis for a "route" to be traversed by an operator of the portable device 104.

The portable unit 104 may include a set of conditional commands 116. The set of conditional commands 116 may be downloaded from the server 102, and may be defined in memory of the portable unit 104. During traversal of the route associated with the list of endpoints, one or more conditional command, from the set of conditional commands 116, may be sent to one or more endpoints 106 from among the list of endpoints 114.

Each endpoint 106 may be associated with a residence, business or other consumer 118. The endpoint 106 may include a resource consumption meter 122, e.g. an electric meter, a gas meter and/or a water meter, or other resource meter. Additionally, each endpoint may include a two-way radio 124, configured to communicate with the radio 112 of the portable unit 104 using radio messages 120. Logic 126 within the endpoint 106 may include a microprocessor, a programmable device such as gate array, programmable array logic (PAL) or application specific integrated circuit (ASIC), or other device configured to provide the functionality described herein. A memory device 128 may include data 130, such as consumption data and information obtained from one or more sensors, such as tamper sensors 132, leak sensors 134, battery level sensors and/or estimators 136, etc. Battery life estimators may estimate battery life based on past usage, including a number of transmit cycles and the amount of time elapsed with the processor running, etc. A battery 138 provides power to the various components. Cabling 140 may provide connectivity to various devices, such as sensors, including the leak sensor 134, the battery sensor 136 and the tamper sensor 132.

Example Portable Unit

Figure 2:
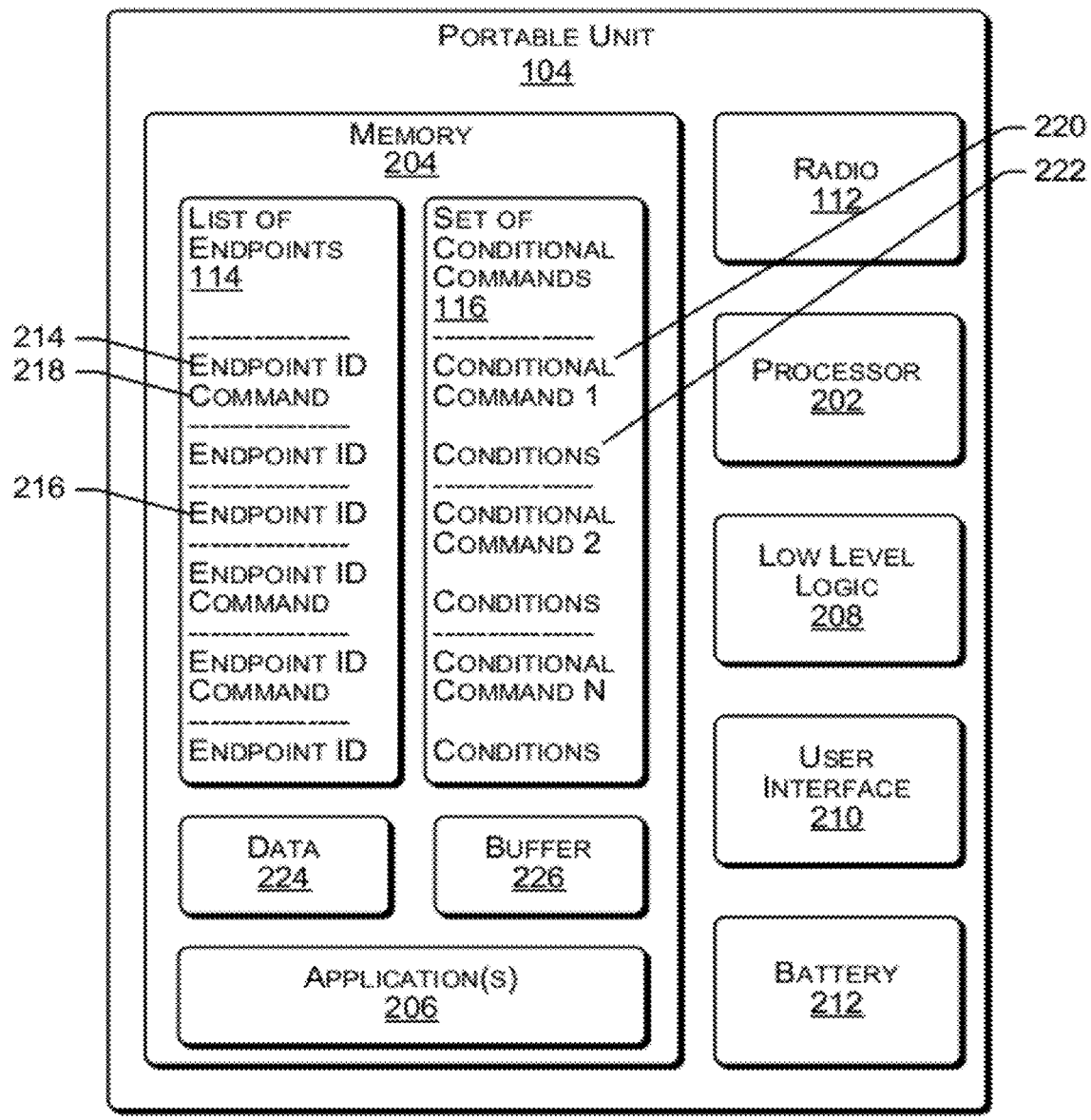
FIG. 2 is a block diagram showing example detail within a portable unit. The portable unit may be moved for collection of data from the endpoints. The block diagram shows an example of a list of endpoints containing commands associated with some endpoint IDs and an example of a set of conditional commands and the respective conditions.

FIG. 2 is a block diagram showing example detail of the portable unit 104. The portable unit includes a two-way radio 112, configured for communication with endpoints 106 (see FIG. 1). The portable unit 104 may also include a processor 202, such as a microprocessor or other device configured to provide the functionality described herein. The processor 202 is in communication with a memory 204 device. The processor 202 may be configured to execute one or more applications 206 defined in the memory 204. In one example, the applications include processor-executable or computer-readable instructions defined on the memory 204. When executed, processor-executable or computer-readable instructions cause the processor 202 to perform functionality discussed herein.

Low level logic or logic 208 may be provided, and may include a microprocessor, processor or controller and associated software, firmware or machine code. Alternatively or additionally, the logic may include a programmable device such as a gate array, programmable array logic (PAL) or application specific integrated circuit (ASIC) other technology having sufficient speed and versatility. The logic 208 may be configured for special purposes, such as examining data obtained by the radio 112 from an endpoint, and determining if a conditional command should be sent to the endpoint in response. The logic 208 may be faster than the application 206, or included as a specialized portion of the application.

A user interface 210 may include both software and hardware components. In one example, the user interface 210 includes a display screen, a keyboard or keypad, function buttons, a speaker, etc. The function buttons may include a button to cycle power to the radio 112 for a predefined period of time.

A battery 212 provides power to the portable unit 104, allowing an operator to transport the portable unit along a route associated with a plurality of endpoints, to thereby gather data for later transmission to the server or central office.

The memory 204 may also contain the list of endpoints 114 and the set of conditional commands 116. The list of endpoints 114 includes a plurality of endpoints 214, 216 etc. Collectively, the endpoints in the list of endpoints 114 may constitute a "route" that may be traversed by the operator of the portable device 104. By moving the portable device 104 into the geographic vicinity of each endpoint on the list of endpoints 114, consumption data and/or other information may be gathered from each endpoint. The consumption data is particularly relevant to the server or central office for billing purposes, while other information may be useful for endpoint maintenance, issues of meter tampering or other factors.

Each endpoint 214, 216 may or may not be associated with a command 218. That is, each endpoint in the list of endpoints may include an individual association with one or more commands. In the example of FIG. 2, an endpoint represented by endpoint ID 214 is associated with a command 218, while the endpoint represented by endpoint ID 216 is not associated with a command. Such commands may be referred to as "primary" commands, and are entered into the list of endpoints 114 by the server or central office so that a command will be sent to an endpoint. Typically, the command is a request for additional information. For example, if a customer is moving out of a residence on a mid-billing cycle date, there may be a need to split the bill for that month with a new customer. Thus, the command may ask for additional pro-rata billing information. Alternatively, the command may order the endpoint to reset a sensor, adjust radio signal strength or make any of a number of other changes, adjustments or calibrations.

The set of conditional commands 116 may include a number of conditional commands 220 and associated conditions 222. In operation, the portable unit 104 may receive messages from endpoints that indicate conditions of those endpoints. Such conditions may be recognized by the application 206, as executed by the processor 202. However, due to timing constraints, the conditions may be recognized by low level logic 208, which may include machine code or hardware logic that more rapidly recognizes the conditions. Once the conditions are recognized, a command (e.g. command 220) associated with the recognized conditions (e.g., conditions 222) may be transmitted to an endpoint having the recognized conditions.

Data, database, object or data structure 224 may be configured as required and/or appropriate for containing and transmitting data collected by the portable unit 104 to the server or central office (102, FIG. 1). Accordingly, data obtained from endpoints in the list of endpoints 114 may be populated into the data 224. In one example, data from the buffer 226 may be passed to an API and into the application 206, which populates the data into 224.

A buffer 226 may be used by the portable unit 104 as a temporary repository of data sent by one or more endpoints. In one example, data may be obtained from endpoints in an out-of-order sequence. Such data may be considered "read-ahead" data. Read-ahead data is data that is read and/or received before data associated with the current endpoint. The current endpoint is a first endpoint in the list of endpoints for which data has not yet been populated into a format and/or structure 224 for upload to a head-end 102. When obtained, read-ahead data may be temporarily stored in the buffer 226 until it may be populated into the data structure 224.

Example Read-Ahead Techniques

Figure 3:
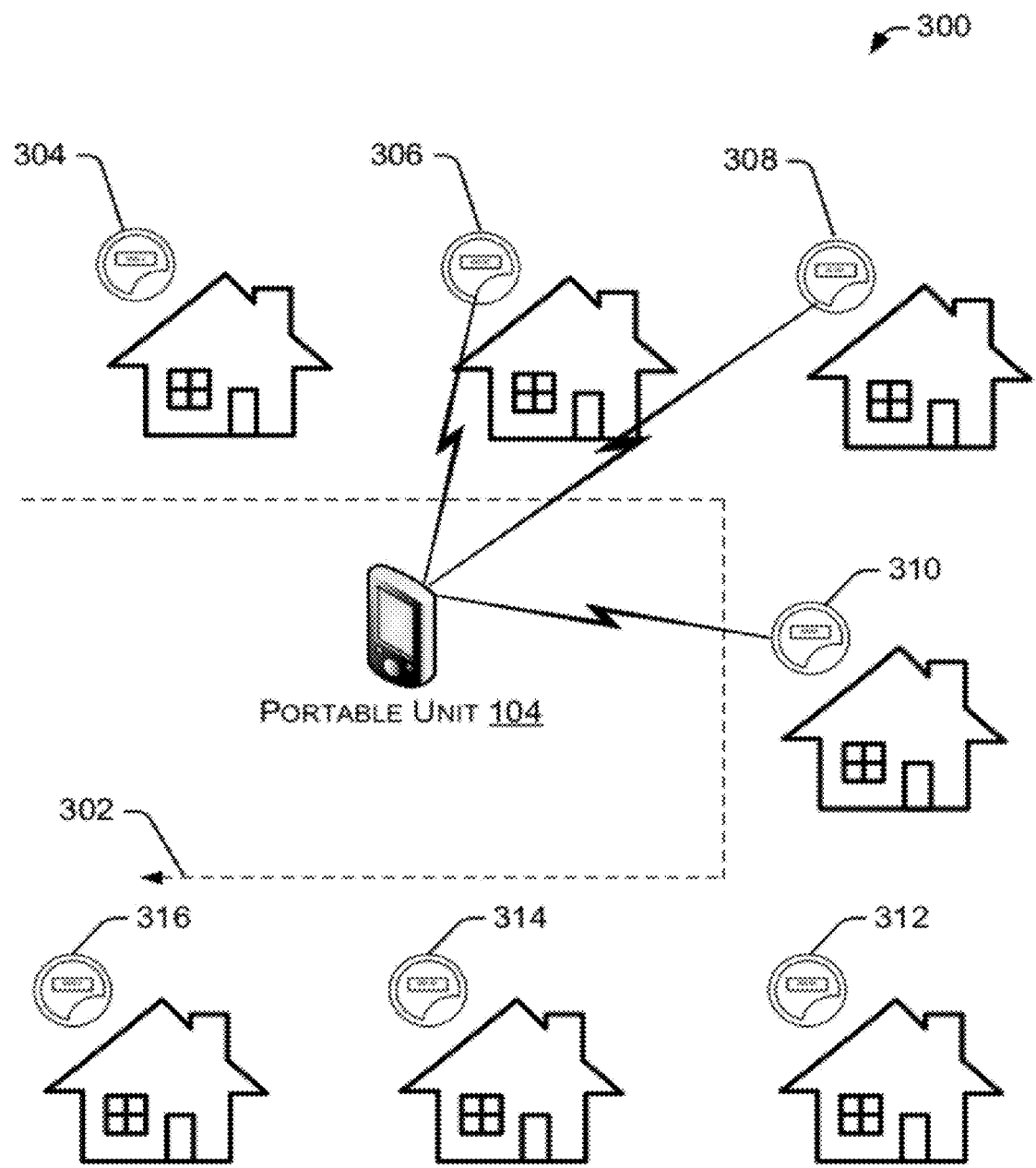
FIG. 3 is schematic diagram illustrating example read-ahead techniques for data logging. In one example, the portable unit may receive data from a plurality of endpoints other than a "current" endpoint. The data may include both messages from the endpoints and responses from the endpoints to commands previously sent to the endpoints. Read-ahead techniques allow capture of such out-of-turn data, which may be buffered for later use.

FIG. 3 is schematic diagram 300 illustrating example read-ahead techniques for data logging. In one example, the portable unit 104 may traverse a route 302 that is associated with a list of endpoints 114 (see FIG. 2) contained within memory 204 of the portable unit 104. The list of endpoints may include the endpoints 304-316. The order of the endpoints 304-316 reflects the order the endpoints are listed in the list of endpoints 114 (FIG. 2). As data is obtained from each endpoint on the list of endpoints, a first endpoint in the list of endpoints for which data has not been obtained becomes the "current" endpoint, i.e., an endpoint "currently" being worked on. Data obtained from endpoints beyond the current endpoint may be buffered or otherwise stored for later use, organization, formatting and/or transmission. Such data, obtained from endpoint(s) beyond the current endpoint, is considered to be read-ahead data.

Data for each endpoint may be obtained from one or more sources. First, the portable unit 104 receives a message (e.g., a "standard consumption message") from endpoints that are within radio range. Such messages may include an identification of the endpoint (e.g., an endpoint ID) and consumption data (e.g., how many kilowatt hours of electricity have been consumed). Such messages may be "pushed" from the endpoints, i.e., they are spontaneously and/or periodically sent from the endpoints, and are typically not sent in response to a request. Such messages may be said to "bubble up" from the endpoints.

A second source of data for some endpoints results from responses to a "primary" command associated with the endpoint. As seen in the list of endpoints 114 (FIG. 2), some endpoints may be associated with a command. Primary commands may be sent upon receipt of a standard consumption message "pushed" from an endpoint. When a response is received to the primary command, the response may be recorded by the portable unit 104. In particular, if the response to the primary command is received from the current endpoint, it may be recorded with data 224, and otherwise it may be buffered at 226 until needed (see FIG. 2).

A third source of data is responses by endpoints to conditional commands. As seen in the set of conditional commands 116 (see FIG. 2), conditions of each endpoint may be analyzed to see if they meet certain conditions. Conditions may be indicated by flags or data sent in messages from the endpoints. If conditions (e.g., conditions 222) are met, then an associated command (e.g. command 220) may be transmitted. Responses to such conditional commands may be buffered or logged by the portable unit 104 as it traverses the route 302.

FIG. 3 shows the portable unit 104 in communication with a plurality of endpoints 306-310 simultaneously. Communication with endpoints beyond the current endpoint in the list of endpoints results in read-ahead data, which may be buffered. In the example of FIG. 3, the current endpoint is endpoint 306. Data has already been obtained from endpoint 304, which may have preceded endpoint 306 on the list of endpoints. A radio cycle of the portable unit 104 may result in reception of many standard consumption messages. Messages already logged can be ignored. A message associated with a current endpoint can be logged into the data structure 224 (see FIG. 2). Messages not yet logged, and which are received out-of-order, may be buffered at 226 into the portable unit for later addition to the data structure. Such data is considered read-ahead data.

Example Primary and Conditional Command Techniques

Figure 4:
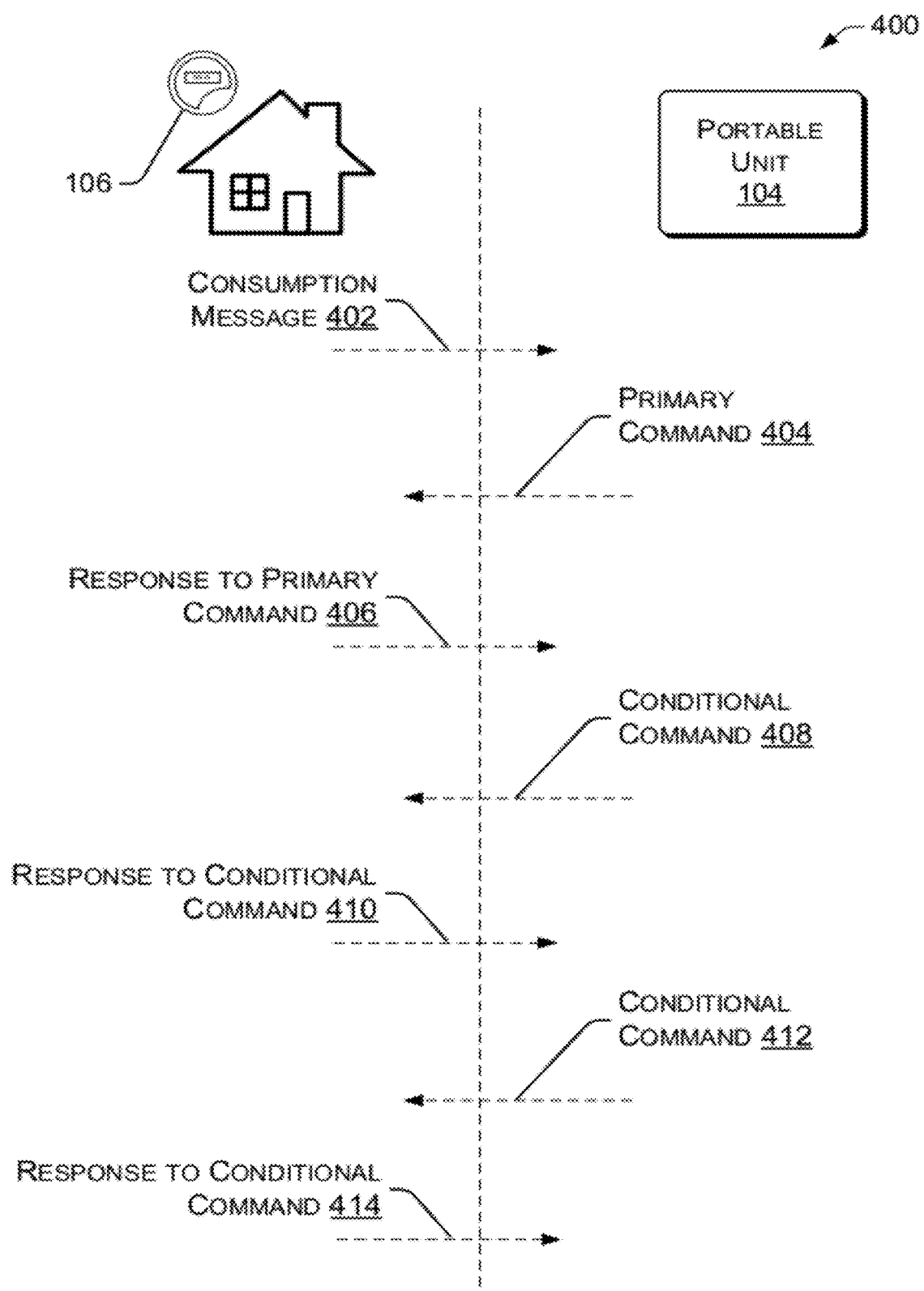
FIG. 4 is a diagram showing an example of two-way communication between an endpoint and a portable unit. In the example communication, the endpoint provides a consumption message, a response to a primary command and responses to one or more conditional commands.

FIG. 4 is a diagram showing an example of two-way communication 400 between an endpoint 106 and a portable unit 104 (e.g., see FIG. 1). In the example communication, the endpoint 106 provides a consumption message 402. The consumption message will typically have a standard or expected format, and may be considered a standard consumption message. The consumption message will typically provide an endpoint ID of the transmitting endpoint, as well as consumption data. The consumption data may be obtained from one or more meters associated with the endpoint 106. The meters may provide data, for use in the consumption message, concerning the usage of natural gas, electricity, water or other resource. The consumption message may also provide one or more flags, bits or other data, which may indicate a condition(s) of the endpoint.

The portable unit 104 may cycle power to its radio, providing a number of seconds or minutes of two-way operation. During this period of time, the consumption message 402 (e.g., a standard consumption message) is received by the portable unit 104. Reception of the consumption message 402 alerts the portable unit 104 to the proximity of the endpoint from which the consumption message was sent. If the consumption message has not previously been saved, the portable unit may save the consumption message 402. In one example, if the endpoint from which the consumption message was sent is the current endpoint, data from the consumption is saved into data structure 224 (FIG. 2). If the endpoint from which the consumption message was sent is past the current endpoint on the route (i.e., later on the list of endpoints), the read-ahead data from the consumption may be saved into buffer 226 for later transfer to the data structure 224 (FIG. 2).

In one example, reception of a consumption message 402 by the portable unit 104 causes the portable unit to search the list of endpoints 114 for a command (e.g., command 218 in FIG. 2) associated with the endpoint sending the consumption message (e.g., endpoint 214). The search may be performed by the application 206 (FIG. 2) or the firmware and/or low level logic 208, which may provide the required speed if the radio cycle is short. The search may find such a primary command in the list of endpoints associated with the endpoint. The command 404 illustrates that situation. Command 404 can be considered a "primary" command, in that it is authorized or mandated by the server, head-end or central office 102 that created the list of endpoints. Accordingly, FIG. 4 shows that the primary command 404 may be transmitted from the portable unit to the endpoint 106.

Upon receipt of the primary command 404, the endpoint 106 may respond by sending a response 406 to the primary command. In one example, the response 406 may include consumption data (such as a pro-rata division of a billing period according to a change in customer responsibility). In another example, the response 406 may include data concerning maintenance or condition of the endpoint 106 and/or included meters, radio, battery, etc.

A conditional command 408 may be sent by the portable unit 104. If a condition or circumstance of the endpoint 106 is met, then a conditional command is sent by the portable unit 104 to the endpoint 106. In one example, low level logic 208 (or the application 206, if the radio cycle is long enough) examines the set of conditional commands 116 (see FIG. 2) and determines if the conditions (e.g., condition 222) associated with a conditional command (e.g., command 220) is appropriate. If the conditions of a command are true, then a conditional command 408 is sent.

Upon receipt of a conditional command 408, the endpoint may reply with a response 410 to the conditional command. In some cases, a further conditional command 412 from the portable unit may be indicated by conditions, and a response 414 is therefore sent by the endpoint.

Example Methods

The acts comprising the example methods may be performed under control of one or more processors and/or logic configured with executable instructions and/or hardware coding. Additionally or alternatively, the acts may be performed using one or more computer-readable media storing computer-executable instructions that, when executed, cause one or more processors to perform the acts.

Regarding media and memory, note that the portable unit 104 may have additional features and/or functionality. For example, the portable unit 104 may also include additional data storage devices (removable and/or non-removable) such as, for example, magnetic disks, optical disks, or tape. Such additional storage may include removable storage and/or non-removable storage. Computer-readable media may include, volatile and non-volatile, removable, and non-removable media implemented in any method or technology for storage of information, such as computer readable instructions, data structures, program modules, or other data. The memory 204, the removable storage and the non-removable storage are all examples of computer storage media. Computer storage media includes, but is not limited to, random access memory (RAM), read only memory (ROM), electrically erasable programmable read only memory (EEPROM), flash memory or other memory technology, compact disk-read only memory (CD-ROM), digital versatile disks (DVD), or other optical storage, magnetic cassettes, magnetic tape, magnetic disk storage or other magnetic storage devices, or any other non-transmission medium that can be used to store the desired information and which can be accessed by the portable unit 104. Any such computer readable media may be part of the portable unit 104. Moreover, the computer-readable media may include computer-executable instructions that, when executed by the processor(s) 202 or logic 208, perform various functions and/or operations described herein. As defined herein, computer readable media does not include transitory media such as carrier waves and data signals.

Figure 5:
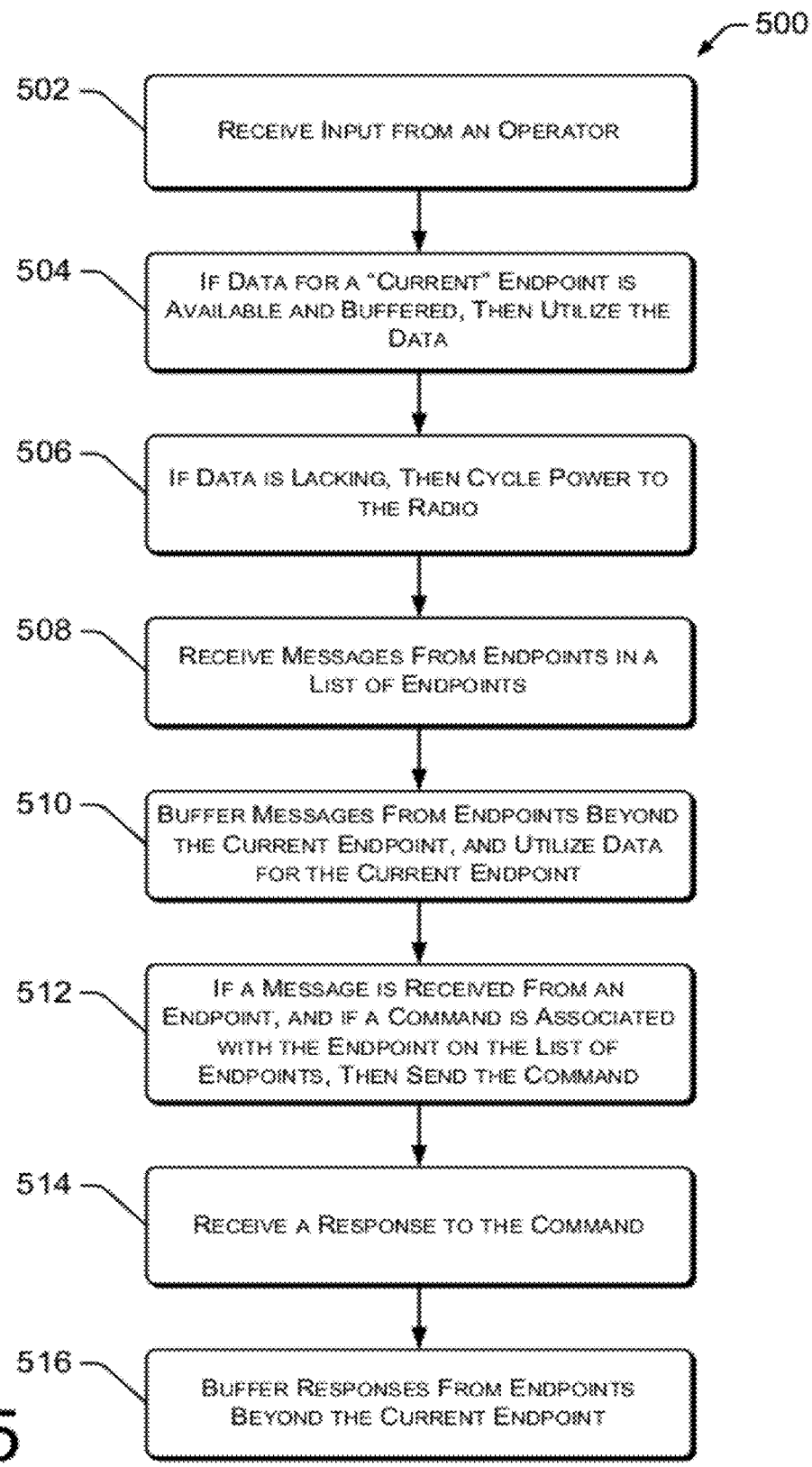
FIG. 5 is a flowchart illustrating an example method by which two-way commands between a portable unit and endpoint(s) may be conducted, particularly illustrating examples of read-ahead techniques for data logging.

FIG. 5 is a flowchart illustrating an example method 500 by which two-way commands between a portable unit and endpoint(s) may be conducted, particularly illustrating examples of data logging using read-ahead techniques and two-way communications.

At 502, an input is received at the portable unit from an operator. In one example, the operator presses a button on the portable unit 104, which may be part of the user interface 210 (FIG. 2).

At 504, if data for a "current" endpoint is available and buffered, then the data is utilized. The current endpoint may be a first endpoint in the list of endpoints for which data has either not been obtained, or has not yet been populated into a format for upload to a head-end. The data required for the current endpoint may be available due to previous read-ahead activity by the portable unit. In particular, while a previous endpoint was the "current" endpoint, the data from the current "current" endpoint may have been obtained by reading ahead. Accordingly, the data required for the current endpoint may be available and buffered.

At 506, if the data is not available, then power is cycled to a radio within the portable unit. The power cycle can be of any duration, such as several seconds, several minutes or more. In a first example, the length of the power cycle is based on a targeted read, such as a read of the current endpoint. Once data has been obtained from the endpoint(s) associated with the targeted read, the power cycle to the radio is concluded. If the read of data associated with the targeted endpoint is not concluded within a pre-configured timeout, the radio cycle is also concluded. In another example, the scheduled end of the power cycle may be extended to allow reception of a response to a command sent prior to the scheduled end of the power cycle. In a further example, the length of a power cycle may be based, at least in part, on a number of messages from endpoints received.

At 508, messaged from endpoints in a list of endpoints are received. The messages may include messages from previously processed endpoints, which can be ignored. Messages from the current endpoint and other endpoints beyond the current endpoint may be received.

At 510, messages from endpoints beyond the current endpoint are buffered. These messages and data are read-ahead data. Data from the current endpoint is utilized. In this example, read-ahead data is buffered (e.g., at 226 in FIG. 2), while data associated with the current endpoint may be utilized, such as by populating the data structure 224 in FIG. 2.

At 512, a "primary" command may be sent to an endpoint (either the current endpoint or an endpoint beyond the current endpoint). The primary command may be sent if such a command is associated with the endpoint ID of the endpoint in the list of endpoints. Note that a number of different primary commands may exist, and that the particular primary command to be sent is specifically indicated by the list of endpoints. In the example of FIG. 2, the command 218 is sent to the endpoint having a particular endpoint ID 214. In the example of FIG. 4, primary command 404 is sent from the portable unit 104 to the endpoint 106. In a further example, receiving a message may trigger a search (by endpoint ID) of the list of endpoints for a command associated with the endpoint from which the message was received.

At 514, a response, sent by the endpoint to which the command was sent, is received at the portable unit.

At 516, data from responses by endpoints beyond the current endpoint (i.e., read-ahead data) is buffered (e.g., at 226 in FIG. 2), while data from the current response may be populated into a data structure (e.g. data structure 224 in FIG. 2) for later transmission to the server at the central office and/or head-end. Regarding the data associated with the current endpoint, an application programming interface (API) may be called to move the data into the application. The application then loads the data structure. Similarly, the buffered data may later be moved to the application 206 by calling on an API as it is needed.

Therefore, FIG. 5 illustrates an example by which read-ahead techniques utilize two-way communications, and a buffer is populated with read-ahead data from endpoints beyond the current endpoint.

Figure 6:
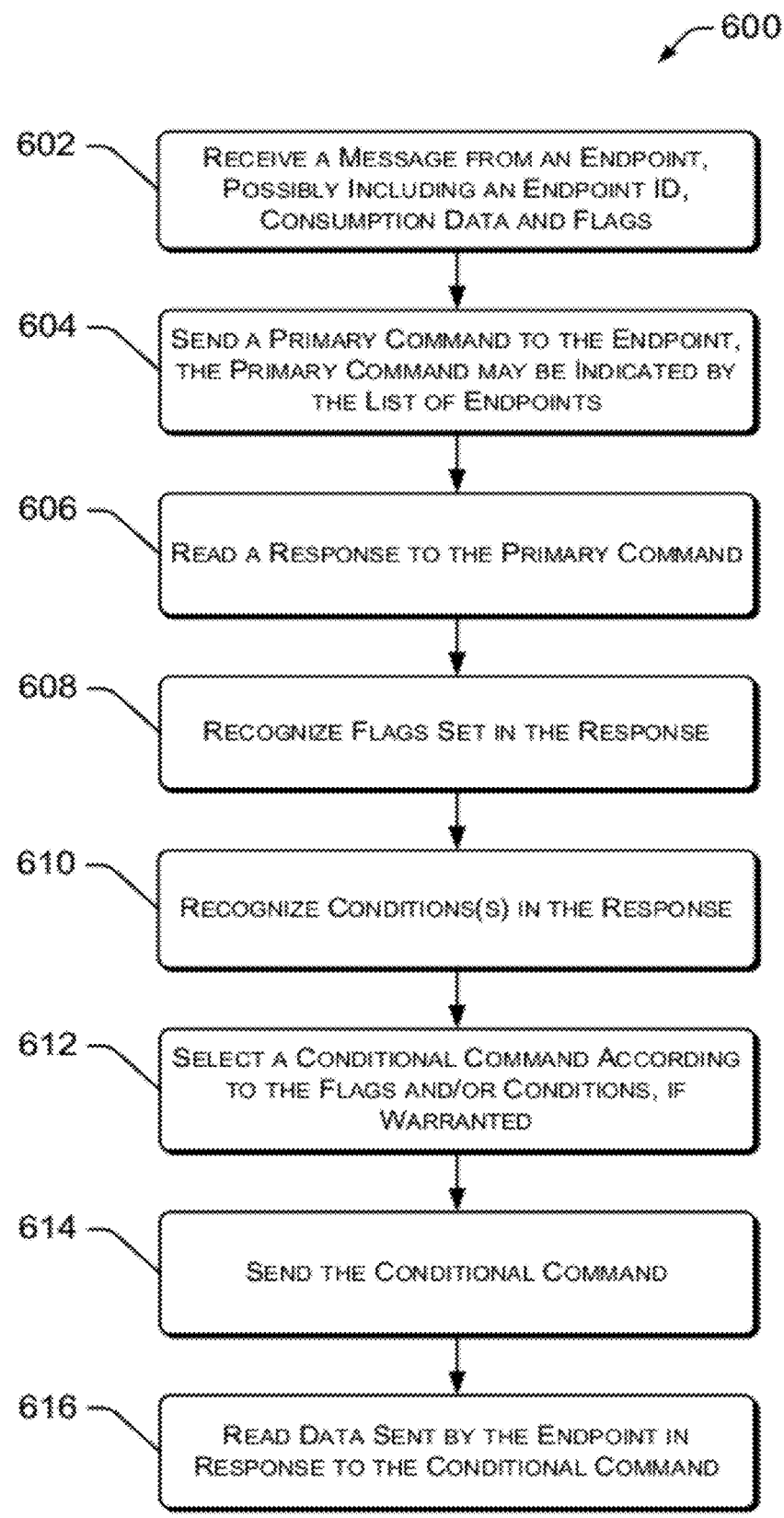
FIG. 6 is a flowchart illustrating an example method by which two-way commands between a portable unit and endpoint(s) may be conducted, particularly illustrating examples of conditional command data reading techniques.

FIG. 6 is a flowchart illustrating an example method 600 by which two-way commands between a portable unit and endpoint(s) may be conducted, particularly illustrating examples of conditional command data reading techniques.

At 602, a message is received from an endpoint, possibility including an endpoint ID, consumption data and flags or other data. At 604, a primary command may be sent to the endpoint having the included endpoint ID. Whether a primary command should be sent, and the particular primary command to be sent, may be indicated by the list of endpoints. In one example, the list of endpoints may be searched, by low level logic or by a processor running low level code (e.g., firmware), for an endpoint having the ID indicated by the received message.

At 606, a response, sent by the endpoint to the portable unit 104, is read. At 608, flags set in the response are recognized. The flags may indicate conditions present at the endpoint. Accordingly, at 610 those conditions are recognized, such as by decoding the flags or otherwise examining data transmitted in the response.

At 612, a conditional command is selected (if warranted and/or indicated) according to the flags and/or conditions. Such a conditional command is sent in response to conditions present at the endpoint. At 614, the conditional command is sent to the endpoint. At 616, data sent by the endpoint in response to the conditional command is read by the portable unit.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable media storing computer-executable instructions, comprising instructions for:
   downloading a list of endpoints into a portable device, the list of endpoints including an association between one or more endpoints in the list of endpoints and a command, the command commanding that data be sent to the portable device;
   cycling power to a radio in the portable device;
   receiving, on the radio of the portable device, messages from endpoints on the list of endpoints;
   identifying a current endpoint in the list of endpoints, the current endpoint being associated with a command and being a first endpoint in the list of endpoints for which data has not yet been populated into a format for upload to a head-end;
   obtaining the command from the list of endpoints, the obtained command associated with the current endpoint from which a message was received at the portable device;
   transmitting the command to the endpoint associated with the message received at the portable device;
   receiving a response to the transmitted command from the endpoint;
   receiving input from an operator;
   in response to the input, cycling power to the radio receiving the messages and transmitting the command;
   receiving a message from an endpoint past the current endpoint on the list of endpoints, the message including consumption data;
   transmitting a command to the endpoint past the current endpoint on the list of endpoints; and
   receiving a response to the transmitted command from the endpoint past the current endpoint on the list of endpoints.

2. One or more computer-readable media as recited in claim 1, additionally comprising instructions for:
   in response to the receiving of the input from the operator:
      if data on a current endpoint in the list of endpoints is available in a buffer, then populating data from the buffer into the format for upload to the head-end; or
      if data on the current endpoint in the list of endpoints is not available in the buffer, then cycling power to the radio.

3. One or more computer-readable media as recited in claim 1, additionally comprising instructions for:

extending a scheduled end of the power cycle to allow reception of a response to a command sent prior to the scheduled end of the power cycle.

4. One or more computer-readable media as recited in claim 1, additionally comprising instructions for:
cycling power to the radio sufficiently to reduce a duty cycle of the radio to below fifty percent of a total operational time;
receiving a plurality of messages during a power cycle to the radio; and
transmitting a command associated with one of the plurality of messages, wherein the transmitting is performed during the power cycle to the radio.

5. One or more computer-readable media as recited in claim 1, additionally comprising instructions for:
concluding the power cycle as soon as either data is obtained from the current endpoint or after a pre-configured timeout is reached.

6. One or more computer-readable media as recited in claim 1, additionally comprising instructions for:
buffering the message including consumption data; and
populating data into the format for upload to the head-end, wherein:
the data includes the buffered consumption data; and
the populating is performed sequentially in time according to an ordering of the list of endpoints.

7. One or more computer-readable media as recited in claim 1, additionally comprising instructions for:
calling an application programming interface (API) to pass the response to the command to an application; and
populating data passed to the application into a data structure for upload to the head-end, wherein the populating is performed sequentially in time according to an ordering of the list of endpoints.

8. One or more computer-readable media as recited in claim 1, wherein receiving a message triggers a search of the list of endpoints for a command associated with an endpoint from which the message was received.

9. One or more computer-readable media as recited in claim 1, additionally comprising instructions for:
buffering data from the response which is out-of-sequence with respect to the list of endpoints; and
populating a data structure with data from the response which is not out-of-sequence with respect to the list of endpoints.

10. A method in a portable device for gathering data, comprising:
configuring the portable device with a list of endpoints, the list of endpoints including an association between one or more endpoints in the list of endpoints and a command, the command commanding that data be sent to the portable device;
cycling power to a radio of the portable device;
receiving messages from endpoints when the radio is powered on, the messages including an endpoint identification (ID) and consumption data;
identifying a current endpoint in the list of endpoints, the current endpoint being associated with a command and being a first endpoint in the list of endpoints for which data has not yet been populated into a format for upload to a head-end;
obtaining the command from the list of endpoints, the obtained command associated with the current endpoint from which a message was received at the portable device;
transmitting the obtained command to each endpoint from which a message is received and for which a command exists in the list of endpoints;
receiving responses from the endpoints to which a command was sent, the responses including additional consumption data;
receiving input from an operator;
in response to the input, initiating the cycling of the power to the radio receiving the messages and transmitting the commands;
receiving a message from an endpoint past the current endpoint on the list of endpoints, the message including consumption data;
transmitting a command to the endpoint past the current endpoint on the list of endpoints; and
receiving a response to the transmitted command from the endpoint past the current endpoint on the list of endpoints.

11. The method of claim 10, additionally comprising:
in response to the receiving of the input from the operator:
if data on a current endpoint in the list of endpoints is available in a buffer, then populating data from the buffer into the format for upload to the head-end; or
if data on the current endpoint in the list of endpoints is not available in the buffer, cycling power to the radio.

12. The method of claim 10, wherein cycling power to the radio comprises:
terminating the power cycle a fixed period of time after initiating the power cycle.

13. The method of claim 10, additionally comprising:
searching the list of endpoints for commands associated with endpoints associated with the received messages.

14. The method of claim 10, additionally comprising:
buffering the message including consumption data; and
populating data into the format for upload to the head-end, wherein:
the data includes the buffered consumption data; and
the populating is performed sequentially in time according to an ordering of the list of endpoints.

* * * * *